G. W. OKEY.
PNEUMATIC AND CUSHION TIRE.
APPLICATION FILED MAR. 20, 1920.
1,390,057.
Patented Sept. 6, 1921.
2 SHEETS—SHEET 1.
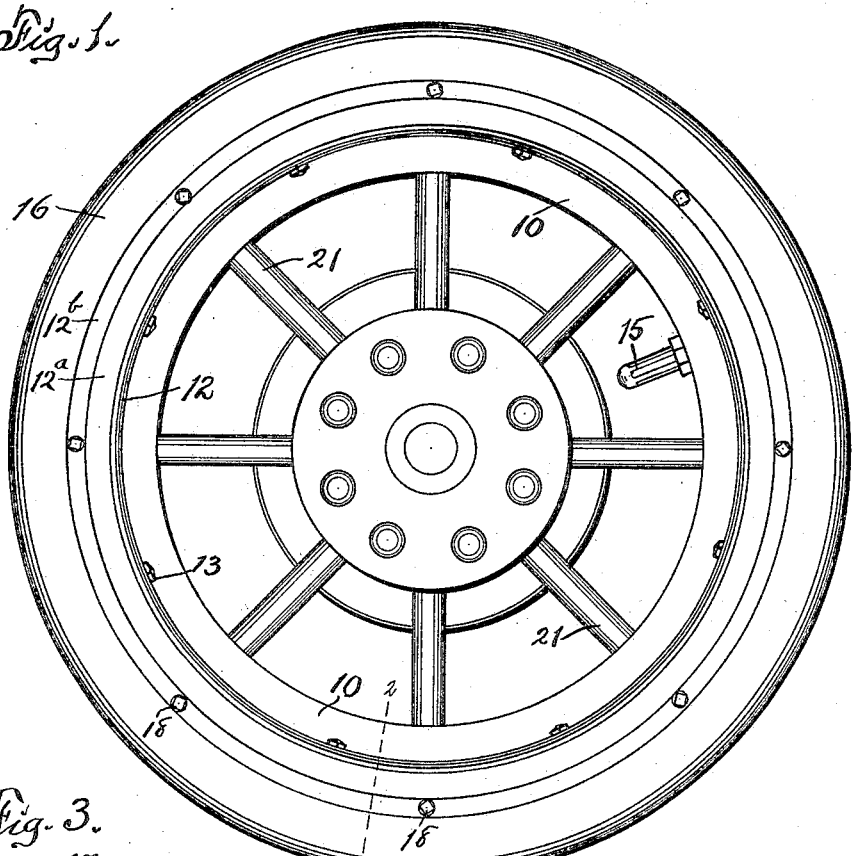
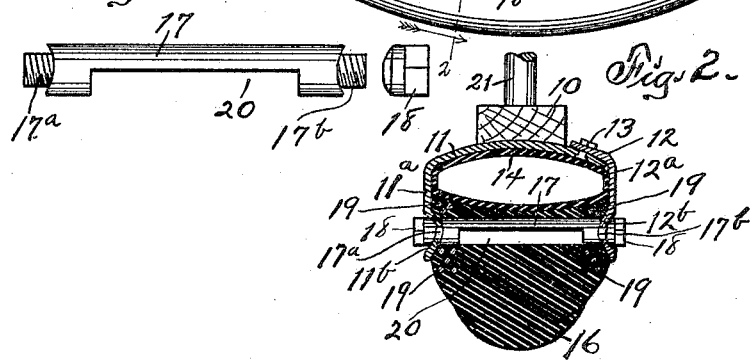
Inventor:
George W. Okey
By Silas L. Sweet
Atty

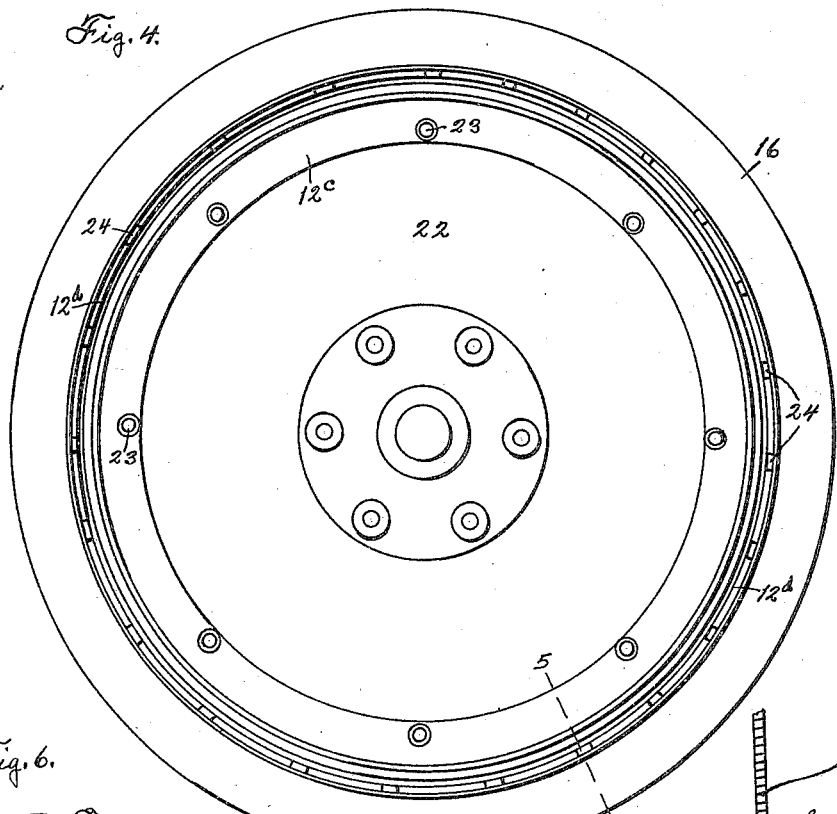
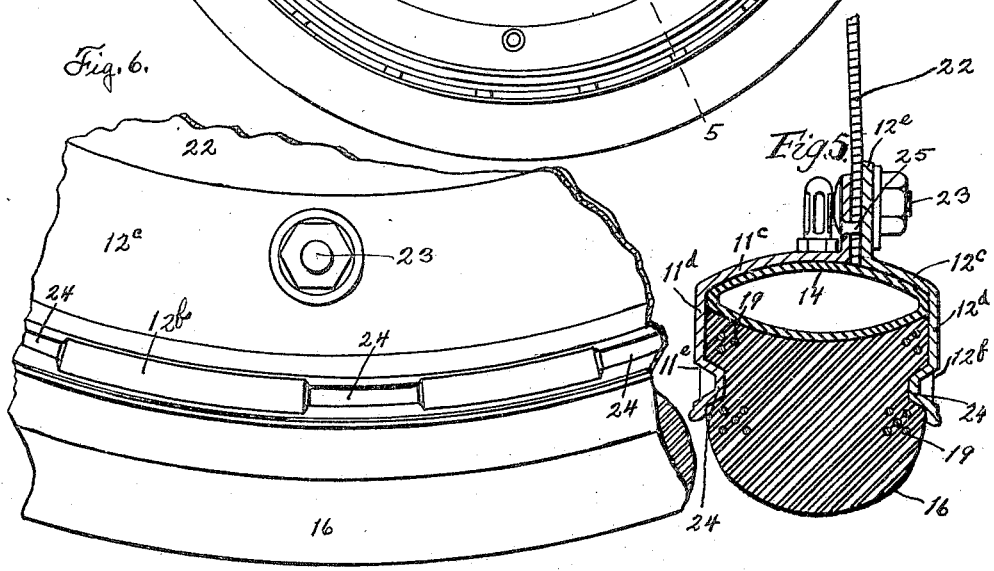

UNITED STATES PATENT OFFICE.

GEORGE W. OKEY, OF DES MOINES, IOWA.

PNEUMATIC AND CUSHION TIRE.

1,390,057. Specification of Letters Patent. Patented Sept. 6, 1921.

Application filed March 20, 1920. Serial No. 367,379.

*To all whom it may concern:*

Be it known that I, GEORGE W. OKEY, a citizen of the United States of America, and resident of Des Moines, Polk county, Iowa, have invented a new and useful Pneumatic and Cushion Tire, of which the following is a specification.

The object of this invention is to provide an improved construction for vehicle tires embodying the characteristics of pneumatic and cushion structures.

A further object of this invention is to provide improved means for mounting and retaining separate tire members on a wheel.

A further object of this invention is to provide improved means for combining a cushion or solid tire with a pneumatic tire, the latter being radially within the former but not substantially embraced thereby.

My invention consists in the construction, arrangement and combination of elements hereinafter set forth, pointed out in my claims and illustrated by the accompanying drawing, in which—

Figure 1 is an elevation of one type of wheel showing my improved tire mounted thereon as required for practical use. Fig. 2 is a cross-section on the indicated line 2—2 of Fig. 1. Fig. 3 is an elevation of a bolt and one nut detached therefrom. Fig. 4 is an elevation of another type of wheel showing my improved tire mounted thereon as required for practical use. Fig. 5 is a cross-section on the indicated line 5—5 of Fig. 4, on an enlarged scale. Fig. 6 is a detail side elevation of a portion of the devices shown in Figs. 4 and 5, on an enlarged scale.

In the construction of my improved devices as shown in Figs. 1, 2 and 3, a novel rim is mounted on a felly 10 carried by spokes 21, and said rim is composed of two members 11, 12. The member 11 of the rim comprises a base portion adapted to be secured on the periphery of the felly and a flange $11^a$ integral with one side margin thereof and extending outwardly therefrom. The flange $11^a$ is formed with a bead $11^b$ and said flange and bead together constitute the tire-retaining portion of the rim located nearest to the body of the vehicle when in use. The member 12 of the rim comprises a base portion overlapping the radially inner face of the flangeless marginal portion of the rim member 11 and detachably secured thereto by bolts 13, preferably having their heads countersunk in the member 11 and having their nuts on the outer face of the portion 12; and also a flange portion $12^a$ integral with one side margin of the base portion and extending outwardly therefrom. The flange $12^a$ is formed with a bead $12^b$ opposite to the bead $11^b$ and said flange and bead together constitute the tire-retaining portion of the rim located on the outside or farthest from the body of the vehicle when in use. Hence the portion 11 and its flange may be termed the permanent portion of the rim, while the portion 12 and its flange may be termed the removable or demountable portion of the rim. The base and flange portions of the rim members preferably join on transversely curved lines so as to present transversely-curved faces for contact with a pneumatic tire member and prevent or avoid pinching and consequent wear thereof. A pneumatic tire member 14, having the characteristics of an inner tube now common and well known and provided with a tire valve 15 of common form, is mounted on the rim and is confined laterally by the flanges thereof. The pneumatic tire 14 preferably is mounted on the rim in deflated or nearly-deflated condition. A tire member 16 having "solid" or "cushion" characteristics, is mounted on the permanent member of the rim while the demountable member is separated therefrom, and said tire member 16 is formed with a concaved inner face adapted to bear against the tire member 14 when the latter is inflated for use. The tire member 16 is retained on the permanent member of the rim by embracing relation of the demountable member when the latter is mounted as shown and the flanges $11^a$ and $12^a$ of said rim members are of such width as to overlap substantial distances on the sides of the tire member, the beads $11^b$ and $12^b$ of the flanges contacting with and embedding in the sides of the tire member. The tire member 16 and the beads of the flanges are formed with registering holes, the holes in the beads being of less diameter than the holes in the tire member. Bolts 17 are mounted in the holes in the tire member 16 and said bolts are formed with reduced and externally threaded end portions $17^a$, $17^b$ forming shoulders on the bolts adjacent the sides of the tire member. The shoulders on each bolt 17 are concaved in order that they may fit and be engaged by inner faces of the beads $11^b$, $12^b$. The bolts 17 are provided with nuts 18 formed with semi-spherical inner end portions adapted to engage the outer faces of the beads 11$^b$, 12$^b$ and bind the flanges to the shoulders of the bolts, said nuts being adapted to be screwed on the reduced end portions of the bolts when said reduced end portions are passed through the holes in the beads. Thus is provision made for clamping the flanges on, and with said flanges compressing, the tire member 16. The bolts may be retained on the permanent member of the rim when the tire members are removed, by firm or permanent setting of the nuts against the flange bead 11$^b$; and the tire members may be removed and replaced by removal and replacement of the demountable portion or member of the rim made possible by removable and replaceable characteristics inherent in the outermost nuts 18. The tire member 16 preferably is provided with circumferentially arranged and embedded wires 19 in marginal portions thereof on opposite sides of the transverse bolt holes therein, which wires reinforce the substance of said tire member. Each bolt 17 preferably is formed with a relatively long notch 20 between its ends and on the radially outer portion thereof when mounted for use; the concaved shoulders acting in connection with the beads and nuts preventing rotation of the bolts relative to the tire and rim when in use. The notches 20 in the bolts 17 provide means for compression of portions of the tire member 16 into said notches because of the diameter of the bolt holes, thus giving cushion characteristics to said tire.

In practical use, the tire member 14 is inflated as shown and forms a cushion for the tire member 16, particularly those portions of the tire member 16 between the bolts and slightly less in respect to the portions of the tire member 16 traversed by the bolts.

In the construction according to Figs. 4, 5 and 6 the felly 10 and spokes 21 are replaced by a plate or disk 22, the wheel in this instance being of the so-called "disk" type. A permanent rim member 11$^c$ is provided, and is of substantially of the same shape as the rim member 11 previously described, being formed at one margin with an integral flange 11$^d$ having a bead 11$^e$ thereon. The flangeless marginal portion of the rim member 11$^c$ is secured rigidly to the peripheral portion of the disk or plate 22; being either integrally formed on said disk or plate, or separately formed and permanently secured thereto as by rivets 25. A removable or demountable rim member 12$^c$ is provided, and is formed with an integral flange 12$^d$ parallel with and spaced from the flange 11$^d$, and with a flange 12$^e$ overlapping the outer surface of the peripheral portion of the disk or plate 22 and removably secured thereto by means of a series of bolts 23, having their heads contacting with the inner surface of said plate or disk and their nuts on the outer face of said flange of the rim member. The flange 12$^d$ of the rim member 12$^c$ is formed with an annular bead 12$^f$ opposed to the bead 11$^e$. A pneumatic tire 14 and a tire member 16 having solid or cushion characteristics are mounted on the rim member 12$^c$ and flange 11$^d$, in a manner somewhat similar to that previously described in connection with Figs. 1, 2 and 3. In this construction the bolts 17 are omitted and dependence is placed upon the gripping and embracing functions of the flanges 11$^d$ and 12$^d$ to retain the tires in place, such function being assisted by the beads 11$^e$ and 12$^f$ which are seated in lateral grooves of the tire member 16. To prevent creeping of the tire members circumferentially of the rim, the flanges 11$^d$ and 12$^d$ preferably are formed with bosses 24 spaced apart in the beads 11$^e$ and 12$^f$ and extending inwardly toward the median line of the tire member 16 a suitable distance from the bottoms of said beads.

I claim as my invention—

1. The combination of a rim made with a demountable member and a solid or cushion tire of resilient type mounted therein, there being registering holes in said rim and tire, of bolts mounted in the holes in the tire and rim, which bolts are formed with notches between their ends whereby portions of said tire may be compressed into said notches.

2. The combination with a wheel having a felly, of a rim formed in two members, one member of the rim extending across and fixed to the felly and having a peripheral flange integral with one margin and laterally spaced from the felly, the other member of the rim overlapping on the first member and detachably secured thereto and also formed with a peripheral flange on one margin laterally spaced from the felly, said flanges adapted to receive a tire between them, and means for securing a tire to said flanges.

3. The combination with a wheel having a felly, of a rim formed in two members, one member of the rim extending across and fixed to and projecting laterally from opposite sides of the felly and having a peripheral flange integral with one margin and laterally spaced from the felly, the other member of the rim overlapping on the inner surface of the first member and detachably secured thereto, the second member of the rim also being formed with a peripheral flange integral with one margin and laterally spaced from the felly, said flanges being adapted to embrace a tire.

Signed at Des Moines, in the county of Polk and State of Iowa, this 16th day of March, 1920.

GEORGE W. OKEY.